(12) United States Patent
Ferraris et al.

(10) Patent No.: US 11,091,007 B2
(45) Date of Patent: Aug. 17, 2021

(54) SYSTEM FOR THERMAL MANAGEMENT OF THE COMPONENTS OF A HYBRID VEHICLE

(71) Applicant: C.R.F. Società Consortile per Azioni, Orbassano (IT)

(72) Inventors: Walter Ferraris, Orbassano (IT); Federica Bettoja, Orbassano (IT); Attilio Crivellari, Orbassano (IT)

(73) Assignee: C.R.F. Societè Consortile per Azioni, Orbassano (IT)

( * ) Notice: Subject to any disclaimer, the term of this patent is extended or adjusted under 35 U.S.C. 154(b) by 139 days.

(21) Appl. No.: 16/510,247

(22) Filed: Jul. 12, 2019

(65) Prior Publication Data

US 2020/0079177 A1    Mar. 12, 2020

(30) Foreign Application Priority Data

Sep. 11, 2018    (EP) .................................... 18193619

(51) Int. Cl.
*B60H 1/00* (2006.01)
*B60L 58/27* (2019.01)
(Continued)

(52) U.S. Cl.
CPC ......... *B60H 1/00642* (2013.01); *B60H 1/004* (2013.01); *B60H 1/00007* (2013.01);
(Continued)

(58) Field of Classification Search
CPC .................. B60H 1/32284; B60H 1/3204; B60H 1/3205; B60H 1/3222; B60H 1/3223;
(Continued)

(56) References Cited

U.S. PATENT DOCUMENTS

| 8,635,882 | B2 * | 1/2014 | Malvicino | ............... B60L 1/003 62/323.1 |
| 8,753,762 | B2 * | 6/2014 | Major | ................. H01M 10/625 429/120 |

(Continued)

FOREIGN PATENT DOCUMENTS

| DE | 19730678 A1 | 1/1999 |
| DE | 102011051624 A1 | 1/2013 |

(Continued)

*Primary Examiner* — Len Tran
*Assistant Examiner* — Jenna M Hopkins
(74) *Attorney, Agent, or Firm* — Heslin Rothenberg Farley & Mesiti P.C.; Victor A. Cardona, Esq.

(57) ABSTRACT

A hybrid vehicle includes a thermal control system having a first high temperature cooling circuit, a second low temperature cooling circuit and a third cooling circuit for cooling/heating a battery pack. A system of valves is configured to connect the third circuit with the second circuit so as to create a loop consisting of a main portion of the third circuit and a main portion of the second circuit including the cooling portion of one or more electric motor assemblies of the hybrid vehicle, one or more additional components of the motor-vehicle, such as a turbocharger assembly and an intercooler assembly. In this operating condition, circulation of the liquid in the loop thus-formed can be activated by the pump of the third circuit and causes heating of the battery pack by the heat generated by the electric motor assemblies and, preferably, by the aforesaid additional components of the motor-vehicle.

6 Claims, 6 Drawing Sheets

Figure 1:
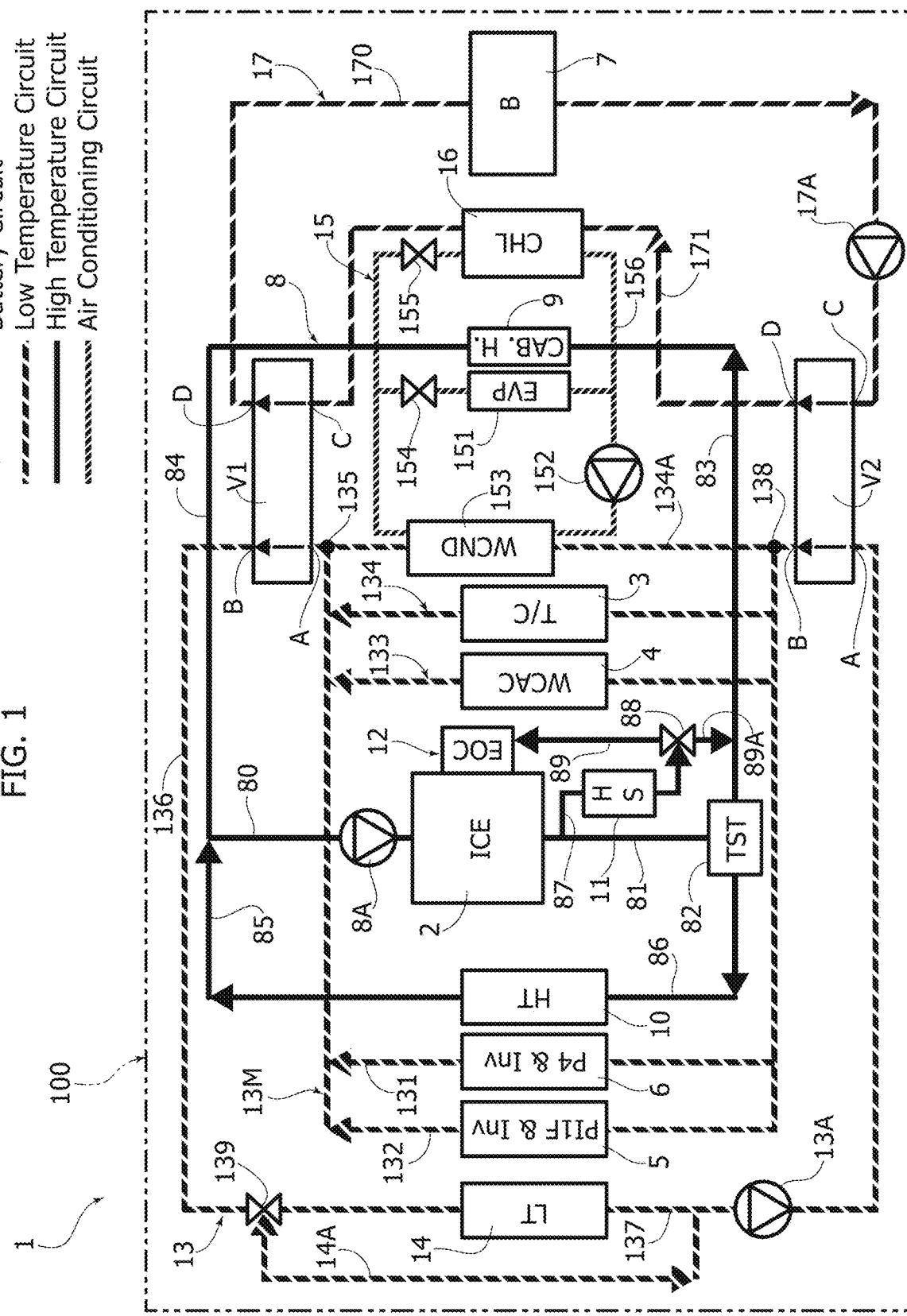

(51) Int. Cl.
| | |
|---|---|
| *B60L 50/60* | (2019.01) |
| *B60L 58/26* | (2019.01) |
| *B60H 1/32* | (2006.01) |
| *B60H 1/06* | (2006.01) |
| *B60H 1/14* | (2006.01) |
| *B60K 1/00* | (2006.01) |
| *B60K 11/02* | (2006.01) |
| *F01P 7/16* | (2006.01) |
| *F02B 29/04* | (2006.01) |
| *B60K 1/02* | (2006.01) |

(52) U.S. Cl.
CPC ..... *B60H 1/00278* (2013.01); *B60H 1/00385* (2013.01); *B60H 1/00485* (2013.01); *B60H 1/06* (2013.01); *B60H 1/143* (2013.01); *B60H 1/3204* (2013.01); *B60H 1/3228* (2019.05); *B60K 1/00* (2013.01); *B60K 11/02* (2013.01); *B60L 50/60* (2019.02); *B60L 58/26* (2019.02); *B60L 58/27* (2019.02); *F01P 7/165* (2013.01); *F02B 29/0493* (2013.01); *B60K 1/02* (2013.01); *B60K 2001/006* (2013.01)

(58) Field of Classification Search
CPC .. B60H 1/3225; B60H 1/3227; B60H 1/3229; B60H 1/323; B60H 1/3232; B60H 1/00278; B60H 1/004; B60H 1/00485; B60H 1/143; B60K 11/02; B60L 3/00; B60L 3/0046
See application file for complete search history.

(56) References Cited

U.S. PATENT DOCUMENTS

| | | | |
|---|---|---|---|
| 8,875,532 B2* | 11/2014 | Neumeister | B60L 3/0046 62/243 |
| 9,649,909 B2* | 5/2017 | Enomoto | B60W 20/00 |
| 9,855,815 B2* | 1/2018 | Saab | B60H 1/00385 |
| 2015/0101789 A1 | 4/2015 | Enomoto et al. | |
| 2018/0117985 A1 | 5/2018 | Kim et al. | |
| 2020/0189357 A1* | 6/2020 | Chopard | B60H 1/00492 |

FOREIGN PATENT DOCUMENTS

| | | |
|---|---|---|
| DE | 112013000833 T5 | 10/2014 |
| DE | 112013003104 T5 | 3/2015 |
| EP | 3246541 B1 | 7/2018 |

* cited by examiner

FIG. 3

SYSTEM FOR THERMAL MANAGEMENT OF THE COMPONENTS OF A HYBRID VEHICLE

CROSS REFERENCE TO RELATED APPLICATIONS

This application claims priority from European Patent Application No. 18193619.6 filed on Sep. 11, 2018, the entire disclosure of which is incorporated herein by reference.

FIELD OF THE INVENTION

The present invention relates to hybrid vehicles, or rather vehicles provided with both an internal combustion engine and one or more electric motor assemblies for vehicle traction.

The invention relates, in particular, to a system and a method for the thermal control of the components of a hybrid vehicle.

PRIOR ART

In recent years, great efforts have been dedicated to reducing energy consumption in vehicles of this type. Thermal management of vehicle components is an important aspect in this respect, for several reasons. First of all, compared to traditional vehicles equipped with an internal combustion engine alone, hybrid vehicles involve additional thermal loads due to the presence of electric motor assemblies, with related electronics and batteries. These components must be maintained within a certain temperature range in order to guarantee optimum performance and to avoid failures. Cold ambient conditions, in particular, affect the batteries in terms of capacity (a very cold battery cannot fully charge), power (a cold battery cannot provide all the power required by the electric motors, which leads to less acceleration of the vehicle) and charge (a very cold battery cannot charge quickly). The easiest and most used solution to resolve the aforesaid problems is to heat the battery pack using a PTC (positive temperature coefficient)-type heating element, but the heat thus generated causes a consumption of energy which results in a reduction in vehicle autonomy.

In the technical article "*Thermal Management Architectures Virtual Evaluation for HEV/PHEV*", SAE publication 2018-37-0025, published on May 30, 2018, the inventors proposed a system for the thermal control of the components of a hybrid vehicle comprising an internal combustion engine, one or more electric motor assemblies and a battery pack. The system proposed in this document included:

a first cooling circuit, in which coolant circulates, for cooling the internal combustion engine, including a pump for activating the circulation of the liquid along said first circuit, a second cooling circuit, in which a coolant circulates for cooling at least one or more of said electric motor assemblies, and preferably also one or more further components of the motor-vehicle, such as a turbocharger assembly and an intercooler assembly, said second circuit including an electrically-operated pump for activating circulation of the liquid along said second circuit, a refrigeration circuit of a system for the air conditioning of the passenger compartment of the motor-vehicle, through which a coolant flows, a third cooling/heating circuit, in which a cooling/heating liquid circulates, for cooling/heating the battery pack, said third circuit including an electrically-operated pump for activating the circulation of the liquid along said third circuit, a heat exchanger acting as a cooler, or chiller, to cool the liquid flowing through the third circuit by means of a cold gas flowing into the air conditioning refrigerating circuit, and a system of valves for controlling the cooling and heating of the battery pack, configured to have the following operating conditions:

a first operating condition for cooling the battery pack, wherein said valve system maintains the third circuit isolated with respect to the first circuit and the second circuit, and wherein said air conditioning system is active, so that the liquid of the third circuit is cooled by the aforesaid chiller, and is thus able to cool the battery pack, and a second operating condition for heating the battery pack, wherein said air conditioning system is inactive, and wherein said system of valves causes said circuit to communicate with said second circuit.

Although the system described in the aforesaid publication forms the first step towards an efficient solution to the problems that have been outlined above, further studies and experiments conducted by the Applicant have shown that there is still room for substantial improvements.

OBJECT OF THE INVENTION

The object of the present invention is, therefore, that of perfecting the solution previously proposed by the inventors themselves, by providing a system in which, in particular, the battery pack can be heated in a truly efficient manner by exploiting the heat generated by one or more electric motor assemblies for traction of the hybrid vehicle, and also preferably by additional components of the vehicle, such as an intercooler assembly and a turbocharger assembly with which the vehicle is provided.

SUMMARY OF THE INVENTION

In view of achieving the aforesaid object, the invention relates to a system having the characteristics indicated above with reference to the previously proposed system, and also characterized in that said system is configured in such a way that in the aforesaid second operating condition, the aforesaid system of valves causes said third circuit to communicate with said second circuit in order to create a loop consisting of:

a main portion of the second circuit which includes the cooling portion of said one or more electric motor assemblies and also, preferably, one or more of said additional components of the motor-vehicle, and of a main portion of the third circuit which includes the cooling portion of the battery pack and the pump of the third circuit, in such a way that in said second operating condition of the system of valves, circulation of the liquid in said loop can be activated by means of the pump of the third circuit, and in such a way that in said second operating condition of the system of valves, the battery pack is heated with liquid from the second circuit, by means of the heat generated by said one or more electric motor assemblies and also, preferably, by means of heat generated by said one or more additional components of the vehicle, such as the turbocharger assembly and the intercooler assembly.

In the preferred embodiment, the aforesaid second circuit comprises:

the aforesaid main portion of the second circuit, including one or more lines in parallel for cooling the said one or more electric motor assemblies and also, preferably, the one or more of said additional components of the motor-vehicle, and an auxiliary line that connects an outlet of said main portion with an inlet of said main portion of the second circuit and including the pump of the second circuit, and in that:

said valve system comprises two four-way valves, each valve having a first and a second inlet and a first and a second outlet, wherein each four-way valve has a first operating condition in which the first outlet is only connected to the first inlet, and the second outlet is only connected to the second inlet, and a second operating condition in which the first outlet is only connected to the second inlet, and the second outlet is only connected to the first inlet, and wherein the two four-way valves are arranged, respectively, with their first inlet and their first outlet interposed in said auxiliary line, upstream and downstream, respectively, of the main portion of the second circuit, and have their second inlet and their second outlet interposed in the aforesaid third circuit, upstream and downstream, respectively, of the battery pack and the pump of the third circuit.

Thanks to all the aforesaid characteristics, the system according to the invention is able to operate as the system previously proposed in the cooling mode of the battery pack, while in the heating mode of the battery pack it is able to more efficiently exploit the heat generated by the electric motor assemblies (including both the electric motors and the relative inverters) and the additional vehicle components, such as the turbocharger and intercooler. The system of the invention is, in fact, configured in such a way that in this heating mode of the battery pack, a loop is created, formed partly by the aforesaid main portion of the second circuit and partly by the aforesaid main portion of the third circuit, in which circulation of the liquid is activated by the electrically-operated pump of the third circuit. This mode can, therefore, be implemented even if the pump of the second circuit is inactive.

In another embodiment, it can be envisaged, when there is an even greater need for heating the battery pack, that the system of valves is configured to have an additional operating condition in which it connects the third circuit with the first circuit, so that the battery pack is heated with coolant of the first circuit, by means of the heat generated by the internal combustion engine. In this case, the valve system also comprises a third three-way valve and a fourth three-way valve, interposed in the aforesaid main portion of the third circuit, upstream and downstream of the battery pack and the pump of the third circuit, respectively. The aforesaid third and fourth valves have an operating condition which simply establishes the continuity of the third circuit, and a second operating condition in which they instead connect the main portion of the third circuit with a portion of the first circuit, so as to form a loop in which the circulation can be activated by the pump of the third circuit.

In order to guarantee heating of the passenger compartment, even when the internal combustion engine remains idle for a prolonged time while the vehicle is moving, the system of the invention is provided not only with a heat exchanger acting as a passenger compartment heater arranged within said first circuit, but also with an additional heat exchanger, also acting as a passenger compartment heater, arranged in the aforesaid second circuit.

Figure 2:
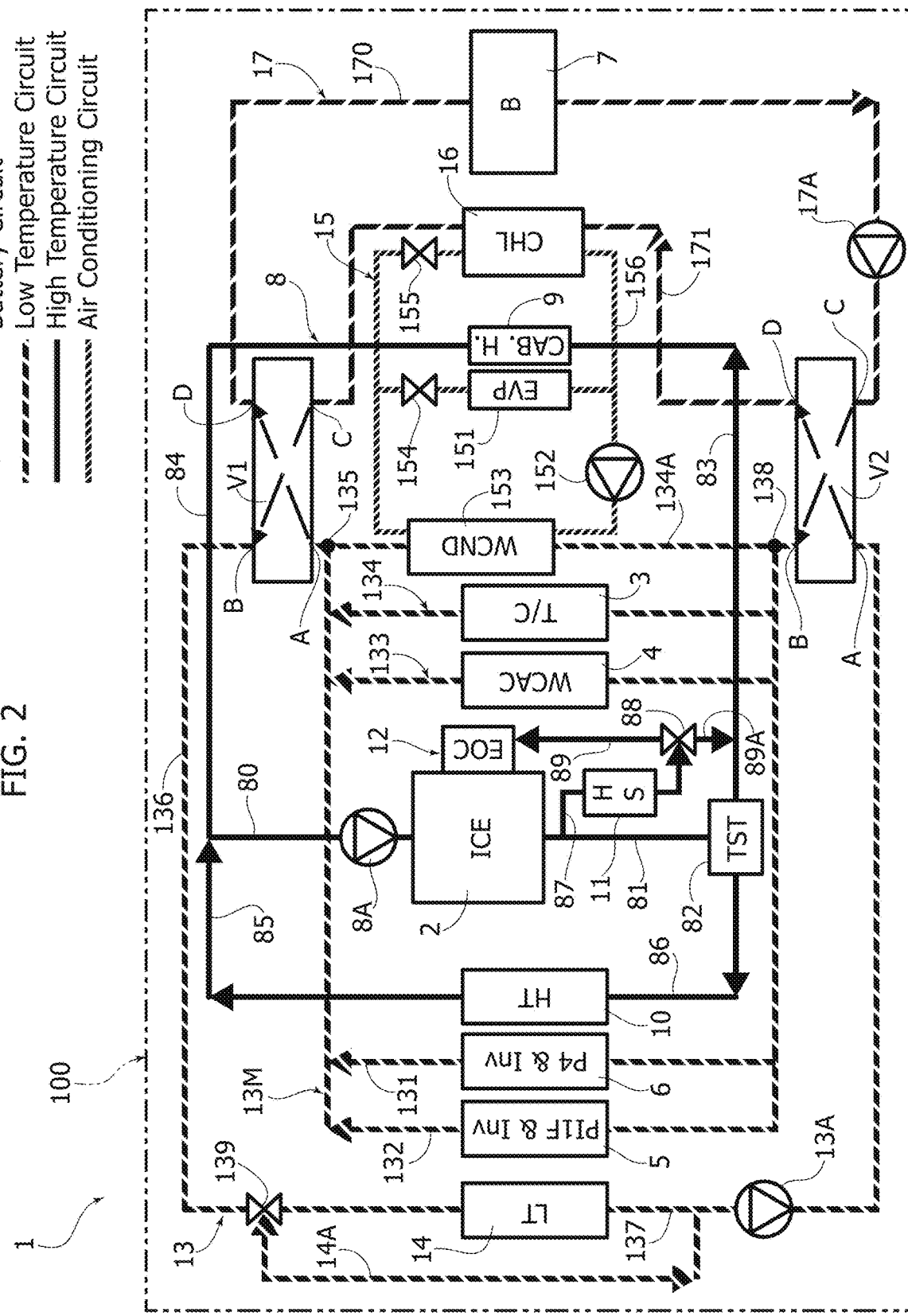
Figure 4:
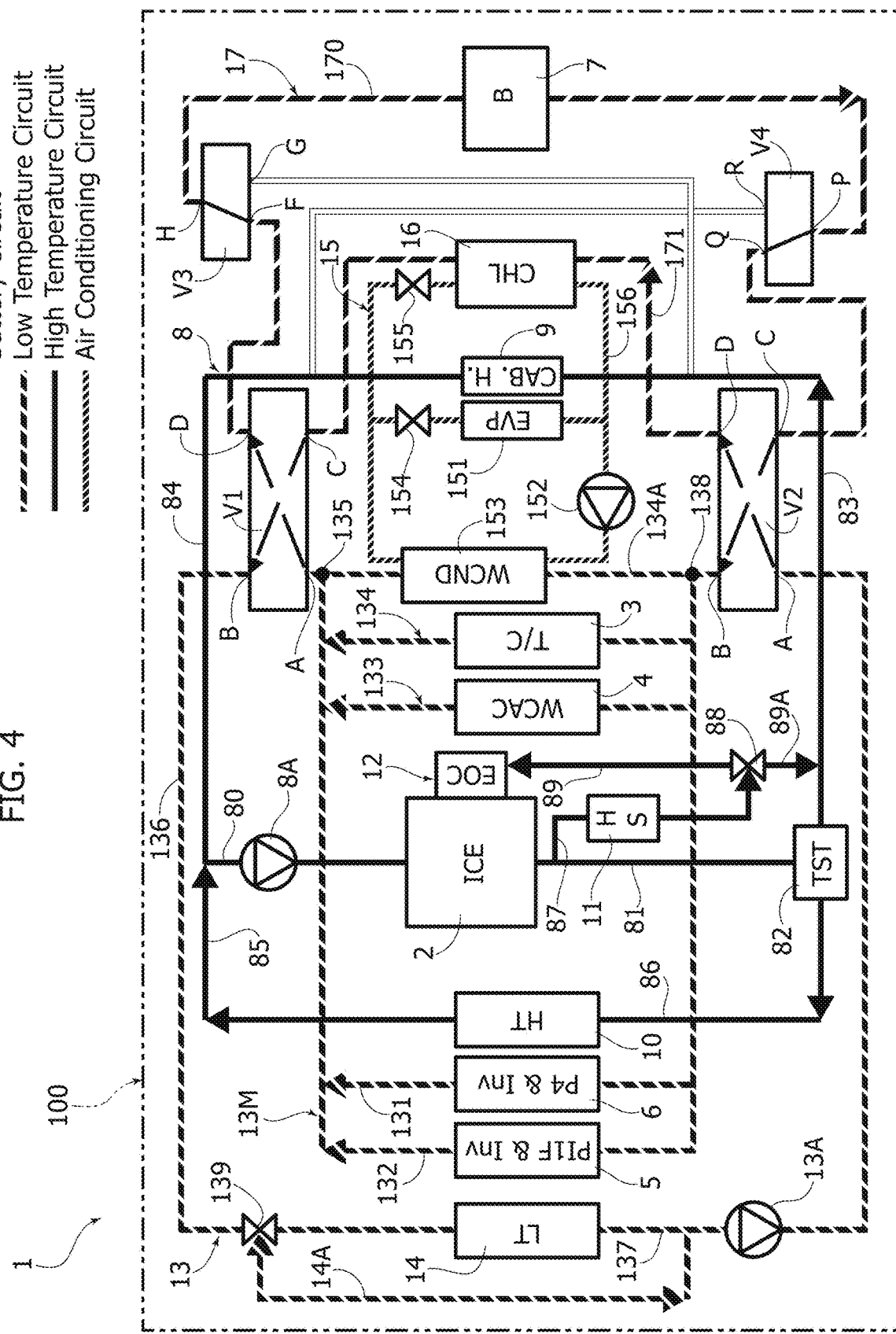
Figure 5:
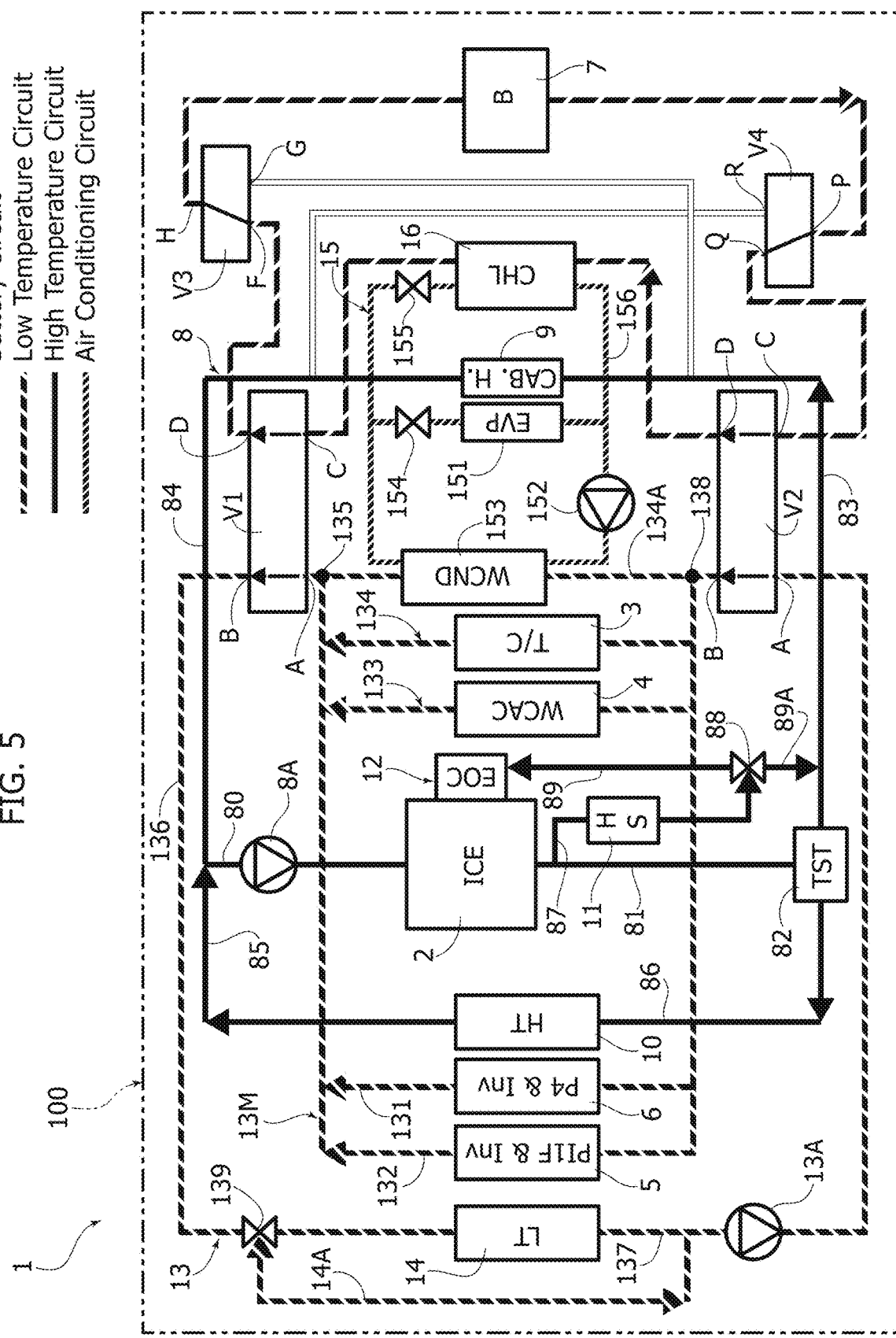
Figure 6:
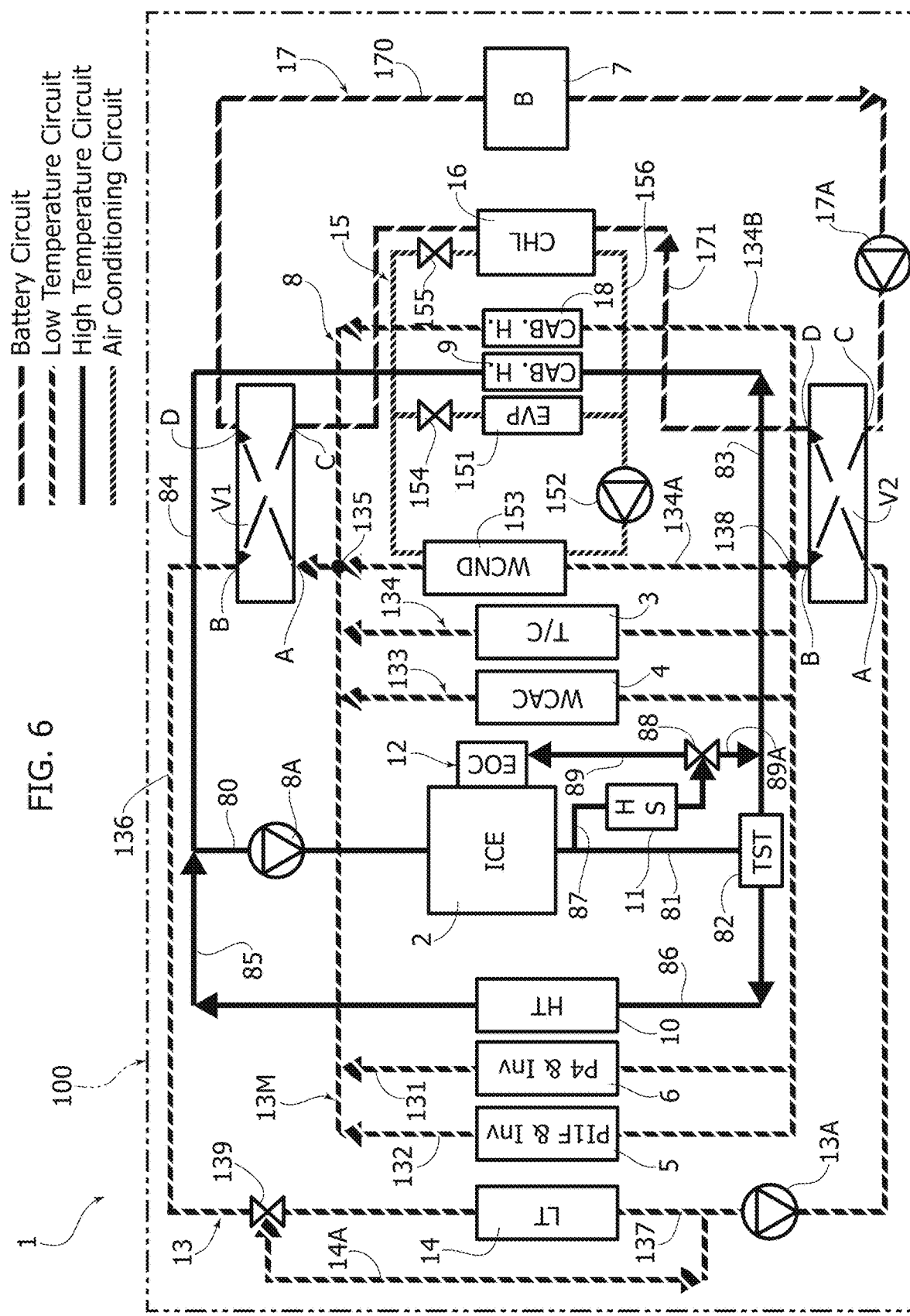

Further characteristics and advantages of the invention will become apparent from the description that follows with reference to the attached drawings, provided purely by way of non-limiting example, wherein:

FIGS. 1 and 2 illustrate two different operating conditions of a first embodiment of the system according to the invention, and FIGS. 3-5 illustrate three different operating conditions of a second embodiment of the system according to the invention, and FIG. 6 illustrates a diagram of an additional variant of the system according to the invention.

GENERAL CHARACTERISTICS OF THE HYBRID VEHICLE

With reference to the diagrams in FIGS. 1 and 2, the reference numeral 1—in its entirety—indicates a system for thermal control of the components of a hybrid vehicle. The example illustrated here refers to a hybrid vehicle including an internal combustion engine (ICE) 2 equipped with a turbocharger (T/C) 3, and with an intercooler assembly (WAC) 4, for cooling the outgoing air from the turbocharger assembly 3 which is supplied to the internal combustion engine 2. The hybrid vehicle also includes a first electric motor assembly 5 for driving the wheels of the vehicle, including an electric motor (PI1F) and the associated inverter assembly, a second electric motor assembly 6, including a second electric motor (P4) and the associated inverter assembly, as well as a battery pack (B) 7, made in any known manner, for the electrical power supply of the motor assemblies 5, 6, and of all the electrical devices on board the vehicle. Of course, the aforesaid configuration is given here purely by way of example.

Thermal Control System—High Temperature Cooling Circuit

The thermal control system comprises a first cooling circuit 8, or a high temperature circuit, in which a coolant circulates, for cooling the internal combustion engine 2, including a pump 8A for activating the circulation of the coolant in the circuit 8. The high temperature cooling circuit 8 can be made in any known manner. Still in a known manner, the pump 8A can be a pump mechanically driven by the internal combustion engine or an electrically-operated pump.

In the example illustrated in FIGS. 1 and 2, the high temperature cooling circuit 8 includes a line 80 in which the pump 8A is inserted, which carries the coolant up to the inlet of the portion of the cooling circuit that crosses the internal combustion engine 2. Again in the case of the specific example illustrated, at the outlet of the internal combustion engine 2, the coolant is fed via a line 81 to an electronically-controlled valve 82. By means of the valve 82, the coolant coming from the line 81 can flow into a line 83 which feeds it to a heat exchanger 9, acting as a heater of the passenger compartment of the motor-vehicle (CAB.H). According to the conventional art, the heat exchanger 9 heats a flow of air directed towards the passenger compartment of the motor-vehicle by means of the heat of the engine coolant. At the outlet of the heat exchanger 9, the coolant of the high temperature circuit 8 is conveyed into a line 84, from which the line 80 that feeds the coolant back to the inlet of the internal combustion engine branches off. From the valve 82, there is also a line 86 which carries the coolant to the inlet of a high temperature radiator (HT) 10, typically located at the front part of the motor-vehicle to use the flow of air entering the engine compartment of the motor-vehicle, in order to cool the liquid supplied by the line 86. At the outlet of the high temperature radiator 10, the coolant is conveyed into a line 85 through which the coolant return to the line 80, towards the pump 8A.

In the specific example illustrated, the high temperature cooling system 8 is of the type that also includes a thermally insulated container 11, configured for storing a quantity of hot coolant during the stops of the internal combustion engine 2. This solution can be implemented, for example, in accordance with the document EP 3 246 541 B1 by the same Applicant. According to this known solution, the thermally insulated container 11 is arranged in a line 87 which branches off from the line 81. When the internal combustion engine 2 is turned off, a certain amount of hot coolant remains within the thermally insulated container 11. When the internal combustion engine is restarted, the coolant contained in the container 11 flows, by means of an electronically-controlled valve 88, either into a line 89 or into a line 89A. The line 89 carries the hot liquid that was contained within the thermally insulated container 11 to a heat exchanger 12 which during normal operation of the internal combustion engine acts as a coolant of the engine lubricant (EOC), but which in the condition described above serves as a heater of the lubricant. In this way, as disclosed by EP 3 246 541 B1, the engine lubrication oil is rapidly brought to a temperature at which the internal combustion engine can operate with maximum efficiency and minimum consumption.

The electronically-controlled valves 82, 88 are controlled by one or more on-board electronic controllers of the motor-vehicle, typically implemented by means of one or more processor modules included in one or more vehicle control units, such as the ECU (Engine Control Unit).

It should be highlighted, however, that the specific example shown is in no way limiting, and that the high temperature cooling circuit can be implemented, for the purposes of the present invention, in any known manner.

Low Temperature Cooling Circuit

Again with reference to FIGS. 1 and 2, the reference numeral 13 indicates—in its entirety—a second cooling circuit, or a low temperature cooling circuit, in which a coolant also circulates, for cooling the electric motor assemblies 5, 6 and preferably also additional vehicle components, such as the intercooler 4 and the turbocharger assembly 3. As clearly shown in the drawings, the low temperature cooling circuit 13 is completely independent of the high temperature cooling circuit 8 and includes a pump 13A, for activating the circulation of the liquid in the circuit 13, which is an electrically-operated pump, so that it can remain active even in the steps in which the internal combustion engine 2 is inactive.

The low temperature cooling circuit 13 comprises a main portion 13M including a plurality of lines 131, 132, 133, 134 connected to each other in parallel, which cross the electric motor assemblies 5, 6, the intercooler 4 and the turbocharger assembly 3, for cooling these components. In the drawings, the arrows along the lines of the circuit indicate the flow direction. The coolant is fed from an outlet 135 of the main portion 13M of the low temperature cooling circuit 13, via a line 136, to the inlet of a low temperature radiator (LT) 14, typically arranged together with the high temperature radiator 10 in the front part of the vehicle, to be cooled by the flow of air entering the engine compartment. The coolant is fed from the outlet of the low temperature radiator 14, through a line 137 and the pump 13A, to an inlet 138 of the main portion 13M of the low temperature cooling circuit 13. In the line 136, upstream of the low temperature radiator 14, an electronically-controlled valve 139 is arranged which is able to supply the coolant coming from the line 136, instead of through the low temperature radiator 14, through a by-pass line 14A which reconverges in the line 137 upstream of the pump 13A. According to the conventional art, the valve 139 is controlled according to the operating conditions of the vehicle and, in particular, according to the cooling requirement of the components 3, 4, 5, 6 which are cooled by the low temperature cooling circuit 13.

Refrigeration Circuit of the Air Conditioning System

Still with reference to FIGS. 1, 2, the number 15 indicates—in its entirety—a refrigeration circuit of the air conditioning system of which the vehicle is provided, for refrigerating the flow of air directed to the passenger compartment of the motor-vehicle. According to the conventional art, the refrigeration circuit 15 uses a refrigerant gas which flows into an evaporator (EVP) 151, provided for cooling a flow of air entering the passenger compartment of the motor-vehicle. At the outlet of the evaporator 151, the coolant is directed to a compressor 152. The fluid leaving the compressor is supplied to a condenser 153. The fluid leaving the condenser 153 expands in an expansion valve 154 from which it is fed back into the evaporator 151.

In the case of the embodiment of the invention illustrated herein, the condenser 153 is cooled by means of the coolant which flows along an additional line 134a of the main portion 13M of the low temperature cooling circuit 13. Again in the case of the embodiment of the invention, the refrigeration circuit 15, with respect to conventional circuits, presents the additional difference of including a heat exchanger 16 acting as a cooler or "chiller" (CHL), where the coolant arrives after being expanded in another expansion valve 155 connected in parallel with the expansion valve 154. The fluid leaving the chiller 16 returns to the compressor 152 via a line 156. The heat exchanger 16 is used, as will be seen below, to cool the hybrid vehicle battery pack in conditions where the temperature of the battery pack tends to exceed a maximum allowable limit (typically due to hot weather conditions).

Battery Pack Cooling/Heating Circuit

Still with reference to FIGS. 1 and 2, numeral 17 indicates a cooling/heating circuit of the battery pack 7, in which a cooling/heating liquid circulates (typically water and glycol, as in the case of the circuits 8, 13).

The circuit 17 includes a line 170 which crosses the battery pack 7, for cooling the latter and which includes an electrically-operated pump 17A, for activating the circulation in the circuit 17. The liquid supplied by the pump 17A flows into a line 171 which crosses the chiller 16, where the coolant is cooled by the coolant of the circuit 15.

Four-Way Control Valves

With reference again to FIGS. 1 and 2, V1 and V2 indicate two four-way valves, which can be implemented in any known manner, and which are interposed in the low temperature circuit 13 and in the battery cooling/heating circuit 17 for controlling the operating conditions of the thermal control system according to the invention. Each of the four-way valves V1, V2, has a first inlet A and a first outlet B and a second inlet C and a second outlet D. Each of the two valves V1, V2 has a first operating condition in which the first outlet B is only connected to the first inlet A, and wherein the second outlet D is only connected to the second inlet C. In a second operating condition (shown in FIG. 2) the aforesaid connections are crossed, so that the first outlet B is only connected with the second inlet C and the second outlet D is only connected with the first inlet A.

As clearly illustrated in FIGS. 1, 2, the arrangement of the valves V1, V2 in the system according to the invention is as follows.

The valve V2 has its first inlet A and its first outlet B interposed in the line 137 of the low temperature cooling circuit 13, upstream of the inlet 138 of the main portion 13M of the circuit. The second inlet C and the second outlet D of the valve V2 are, instead, interposed between the line 170 and the line 171 of the circuit 17 for cooling/heating the battery pack 7.

Therefore, in the operating condition of the valve V2 which is illustrated in FIG. 1, in the low temperature cooling circuit 13, the coolant supplied by the pump 13A flows towards the inlet 138 of the main portion 13M, where the liquid provides cooling of the components 3, 4, and 5, 6. In the same condition, the liquid supplied by the pump 17A in the line 170 of the circuit 17, for cooling/heating the battery pack 7, flows into the line 171 and crosses the chiller 16, so that, if the refrigerant circuit 15 is active, the liquid in the circuit 17 is cooled in the chiller 16 and consequently cools the battery pack 7.

The four-way valve V1 is arranged with its first inlet A and its first outlet B interposed in the line 136, downstream of an outlet 135 of the main portion 13M of the circuit 13. The second inlet C and the second outlet D of the four-way valve V1 are interposed in the line 171 of the circuit 17 for cooling/heating the battery pack 7, downstream of the chiller 16. Therefore, in the operating condition illustrated in FIG. 1, in which the valve V1, like the valve V2, is in the condition in which the AB and CD connections are active, the operation is that already described above. The coolant of the low temperature cooling circuit 13 can flow from the outlet 135 of the main portion 13M into the line 136, while the liquid coming from the line 171 and from the chiller 16 can flow into the line 170 and through the battery pack 7.

FIG. 2 illustrates the system of FIG. 1 in an operating condition in which the battery pack requires heating (for example, in winter conditions or in any cold climate). In the condition of FIG. 2, both four-way valves V1, V2 are in their operating position with the crossed connections AD and CB.

As is evident, the connection BC of the valve V2 and the connection AD of the valve V1 give rise to the formation of a loop constituted partly by a main portion (the line 170) of the circuit 17 for cooling/heating the pack battery 7 and partly by the main portion 13M of the low temperature cooling circuit 13. In the loop thus-formed, circulation of the liquid is activated by the pump 17A of the circuit 17. The circulating liquid takes the heat generated by the components 3, 4, 5, 6 and transfers it to the battery pack 7.

In the above condition, the pump 13A of the low temperature cooling circuit 13 may also be inactive.

Additional Embodiments

Figure 3:
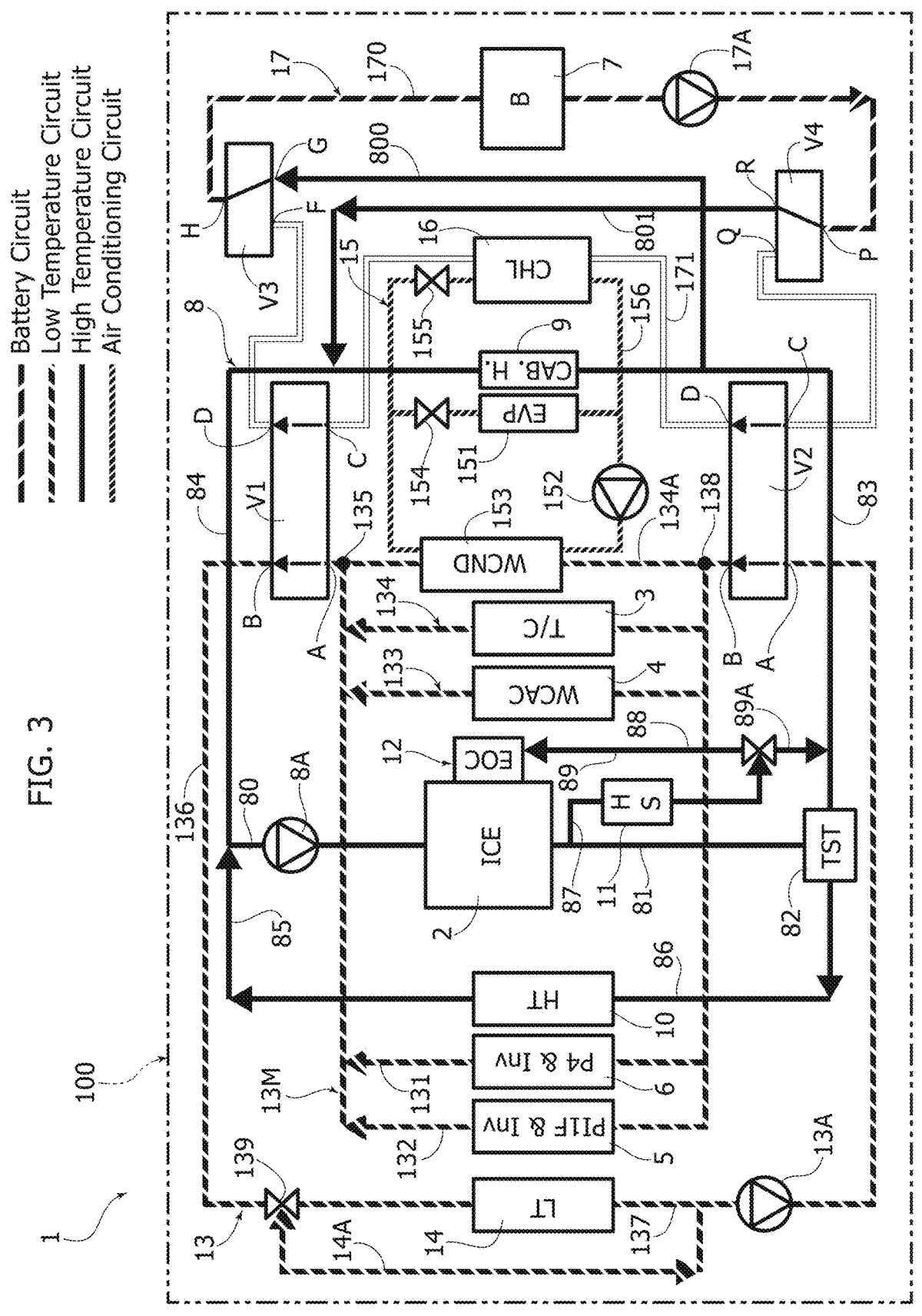

FIGS. 3, 4, and 5 illustrate three different operating conditions of an additional embodiment in which the possibility of heating the battery pack is envisaged, in extremely cold conditions, by using the coolant circulating in the high temperature cooling circuit 8. In this case, the system comprises two additional three-way valves V3, V4, interposed in the line 170 which constitutes the main portion of the circuit 17 for cooling/heating the battery pack 7. The valves V3, V4 are arranged in the line 170, upstream and downstream of the battery pack 7 and the pump 17A, respectively.

The valve V3 has two inlets F, G and an outlet H that can be selectively connected to the inlet F or to the inlet G. The valve V4 has an inlet P and two outlets Q, R that can be selectively connected to the inlet P.

FIG. 3 illustrates the operating condition corresponding to extreme cold conditions. The valves V1, V2 are arranged in the condition in which the connections AB and CD are active. The valves V3 and V4 are arranged in the condition in which the connections GH and PR are active. The inlet G of the valve V3 is capable of receiving liquid from the high temperature cooling circuit 8 by means of a line 800 which branches off from the line 83. The outlet R of the valve V4 is able to supply the fluid coming from the line 170 of the circuit 17 for cooling/heating the battery pack 7 into a line 801, which carries this liquid so that it can flow into the line 84.

As can be seen, in the operating condition of FIG. 3, therefore, a loop is created consisting partly of the main portion 170 of the circuit 17 for cooling/heating the battery pack 7 and partly of the high temperature cooling circuit 8. Circulation of the coolant can be activated either by means of the pump 17A or by means of the pump 8A of the circuit 8.

FIG. 4 illustrates the operating condition in which the battery pack 7 is heated by the coolant of the low temperature cooling circuit 13, using the heat generated by the components 3, 4, 5, 6. The configuration of FIG. 4 is identical to that of FIG. 2, except that in this case the valves V3, V4 create the connections PQ and FH. In this way, the valves V3, V4 become totally irrelevant with respect to the operating mode already illustrated above with reference to FIG. 2.

FIG. 5 illustrates the additional operating condition in which it is necessary to cool the battery pack 7 by means of cooled liquid in the chiller 16. This condition corresponds exactly to that of FIG. 1. In this case as well the valves V3, V4 create the connections PQ and FH, so as to be totally irrelevant with respect to the operating mode which has already been described above with reference to FIG. 1.

Additional Passenger Compartment Heater

FIG. 6 of the attached drawings shows the diagram of an additional embodiment which substantially corresponds to that of FIGS. 1 and 2, except that—in this case—the main portion 13M of the low temperature cooling circuit 13 comprises an additional line 134b, in parallel with the lines 131, 132, 133, 134, 134a, in which a heat exchanger 18 is arranged, acting as a further passenger compartment heater, in addition to the heater 9. The heater 18 is configured to transfer heat to a flow of air supplied to the passenger compartment of the motor-vehicle, to keep the passenger compartment at a required temperature. The heater 18, therefore, exploits the heat generated by the components 3, 4, 5, 6.

As indicated above, the valves V1, V2, V3 and V4 can be made in any known manner. Preferably, these valves are electrically-operated valves, electronically controlled by one or more electronic controllers, in the form of, for example, microprocessors, preferably according to a programmed criterion, depending on the operating conditions of the vehicle and, in particular, the operating conditions of the internal combustion engine, of the electrical components of the vehicle and primarily as a function of the temperature of the battery pack 7.

Of course, without prejudice to the principle of the invention, the details of construction and the embodiments may vary widely with respect to those described and illustrated, without departing from the scope of the present invention.

What is claimed is:

1. A hybrid vehicle comprising:
   an internal combustion engine,
   one or more electric motor assemblies,
   a battery pack,
   a first cooling circuit, in which a coolant circulates, for cooling the internal combustion engine, including a pump for activating the circulation of the coolant along said first circuit,
   a second cooling circuit, in which a second coolant circulates for cooling at least one or more of said electric motor assemblies and one or more further components of the motor-vehicle, said second circuit including an electrically-operated pump for activating circulation of the second coolant along said second circuit,
   a refrigeration circuit of a system for the air conditioning of a passenger compartment of the motor-vehicle, through which a refrigerant coolant flows,
   a third cooling/heating circuit, in which a cooling/heating liquid circulates, for cooling/heating the battery pack, said third cooling/heating circuit including an electrically-operated pump for activating the circulation of the cooling/heating liquid along said third cooling/heating circuit,
   a heat exchanger acting as a cooler, or chiller, to cool the cooling/heating liquid flowing through the third cooling/heating circuit by the refrigeration coolant that flows into the refrigeration circuit, and
   a system of valves for controlling the cooling and heating of the battery pack, configured to have the following operating conditions:
      a first operating condition for cooling the battery pack, wherein said valve system maintains the third cooling/heating circuit isolated with respect to the first circuit and with respect to the second circuit, and wherein said refrigeration circuit is active, so that the cooling/heating liquid of the third cooling/heating circuit is cooled by the aforesaid chiller and is thus able to cool the battery pack, and
      a second operating condition for heating the battery pack, wherein said refrigeration circuit is inactive, and wherein said system of valves causes said third cooling/heating circuit to communicate with said second circuit,
   wherein, in the second operating condition, the system of valves causes said third cooling/heating circuit to communicate with said second circuit in a manner that creates a loop consisting of:
      a main portion of the second circuit which includes a cooling portion of said one or more electric motor assemblies and one or more of said further components of the motor-vehicle, and of
      a main portion of the third cooling/heating circuit, which includes a cooling portion of the battery pack and the pump of the third cooling/heating circuit,
   in such a way that in said second operating condition of the system of valves, circulation of the liquid in said loop can be activated by the pump of the third cooling/heating circuit, and
   in such a way that in said second operating condition of the system of valves, the battery pack is heated with the second coolant from the second circuit, by the heat generated by said one or more electric motor assemblies and also by heat generated by said one or more further components of the motor-vehicle.

2. A vehicle according to claim 1, wherein said system of valves for controlling the cooling and heating of the battery pack is configured to have another operating condition in which said system of valves connects said third cooling/heating circuit with said first circuit, so that the battery pack is heated with coolant from the first circuit, through heat generated by the internal combustion engine.

3. A vehicle according to claim 1, wherein said second circuit comprises:
   one or more lines in parallel, for cooling said one or more electric motor assemblies and one or more of said further components of the motor-vehicle, and
   an auxiliary line that connects an outlet of said main portion of the second circuit with an inlet of said main portion of the second circuit, and
   said valve system comprises two four-way valves, each valve having a first and a second inlet and a first and a second outlet,
   wherein each four-way valve has a first operating condition in which the first outlet is only connected to the first inlet and the second outlet is only connected to the second inlet, and a second operating condition in which the first outlet is only connected to the second inlet, and the second outlet is only connected to the first inlet, and
   wherein the two four-way valves are arranged, respectively, with their first inlet and their first outlet interposed in said auxiliary line, upstream and downstream, respectively, of the main portion of the second circuit, and have their second inlet and their second outlet interposed in the aforesaid third cooling/heating circuit, upstream and downstream, respectively, of the battery pack and the pump of the third cooling/heating circuit.

4. A vehicle according to claim 3, wherein said system of valves also comprises a third three-way valve and a fourth three-way valve, interposed in said main portion of the third cooling/heating circuit, upstream and downstream, respectively, of the battery pack and the pump of the third cooling/heating circuit, said third and fourth valves having an operating condition wherein they simply establish the continuity of said third cooling/heating circuit, and a second operating position in which they connect the main portion of the third cooling/heating circuit with the first circuit, so as to form a loop wherein the circulation can also be activated by means of the pump of the third cooling/heating circuit.

5. A vehicle according to claim 1, wherein in said first circuit a heat exchanger is arranged, acting as a passenger compartment heater, for heating a flow of air directed towards the passenger compartment of the motor vehicle by means of coolant of the first circuit, and wherein a heat exchanger is arranged in said second circuit acting as a heater of the passenger compartment, to heat a flow of air directed towards the motor vehicle compartment.

6. The vehicle of claim 1, wherein said one or more further components comprise a turbocharger assembly and an intercooler assembly.

\* \* \* \* \*